Feb. 12, 1963

H. L. MOHN 3,077,343

FUEL FEEDING SYSTEM

Filed Nov. 5, 1959

INVENTOR
Henry L. Mohn

BY *Kemon + Palmer*

ATTORNEYS

Feb. 12, 1963  H. L. MOHN  3,077,343
FUEL FEEDING SYSTEM
Filed Nov. 5, 1959  2 Sheets-Sheet 2

INVENTOR
Henry L. Mohn

BY Kenyon, Palmer, Stewart & Estabrook

ATTORNEYS

United States Patent Office 3,077,343
Patented Feb. 12, 1963

3,077,343
FUEL FEEDING SYSTEM
Henry L. Mohn, York, Pa., assignor to York-Shipley, Inc., York, Pa., a corporation of Delaware
Filed Nov. 5, 1959, Ser. No. 851,174
8 Claims. (Cl. 263—19)

This invention relates to burners for liquefied petroleum gas and more particularly to fuel handling and feeding systems for burners of this type. While the invention was developed for use in, and will be described primarily with reference to, a crop drier, it should not be considered to be so limited, because the principles disclosed should find wide utility wherever liquefied petroleum gas is to be burned for useful heating purposes at controlled rates.

While crop driers are broadly old, prior art devices for this type of heating suffer from any one of a number of deficiencies. The need for crop driers is for machines of this type which are sufficiently reliable in unattended operation that a farmer can set up one or more truck loads of hay, for example, and turn the crop drier on before retiring for the night and wake up in the morning and find the operation completed. During this time, the ambient temperature may vary over substantial ranges and it is necessary that the temperature of the heated air supplied to the crops remain substantially within fixed limits, in spite of the ambient temperature variations. In order to achieve satisfactory operation of this kind for this type of apparatus, and particularly apparatus for burning liquefied petroleum gas, it has been found necessary to incorporate a number of control features to insure satisfactory operation.

The primary object of the present invention is to provide in a liquefied petroleum gas burner, a fuel feeding and control system therefor which enables accurate, reliable and automatic control of the combustion rates to permit output temperatures within relatively narrow limits, regardless of variations in ambient temperature. Other objects include: (1) the provision in a fuel-feeding system for a liquified petroleum gas burner, of an aftercooler for positively extracting heat from the vaporized fuel prior to metering the fuel to the burner and (2) the provision of a heat exchanger in direct heat-exchange relation with the burner proper to insure complete vaporization of the liquified petroleum gas prior to feeding the fuel to the aftercooler. Other objects will be apparent from the following description, taken in conjunction with the attached sheets of drawing, in which:

In general, the objects of the present invention are achieved by providing first an automatically controlled expansion valve of the type commonly used in refrigeration circuit controls. The liquid gas is fed first to the expansion valve. Expansion through the valve is controlled in accordance with downstream pressure by means of an external equalizing line connected to the main line at the desired point. The purpose is to insure that gas at a substantially constant pressure is fed to the main burner. From the expansion valve, the fuel is fed to a vaporizer chamber which is in direct heat exchange relation with the burner itself. The addition of heat at this point insures vaporization of any fuel which did not flash into vapor as it passed through the refrigerant type expansion valve. In view of the fact that heat is added to the gas during the vaporization process, it has been found necessary to cool the thus vaporized gas within predetermined limits in order that the temperature of the gaseous fuel be held within fixed limits which will not be detrimental to the metering valve or other controls downstream of the vaporizer.

Figure 1:
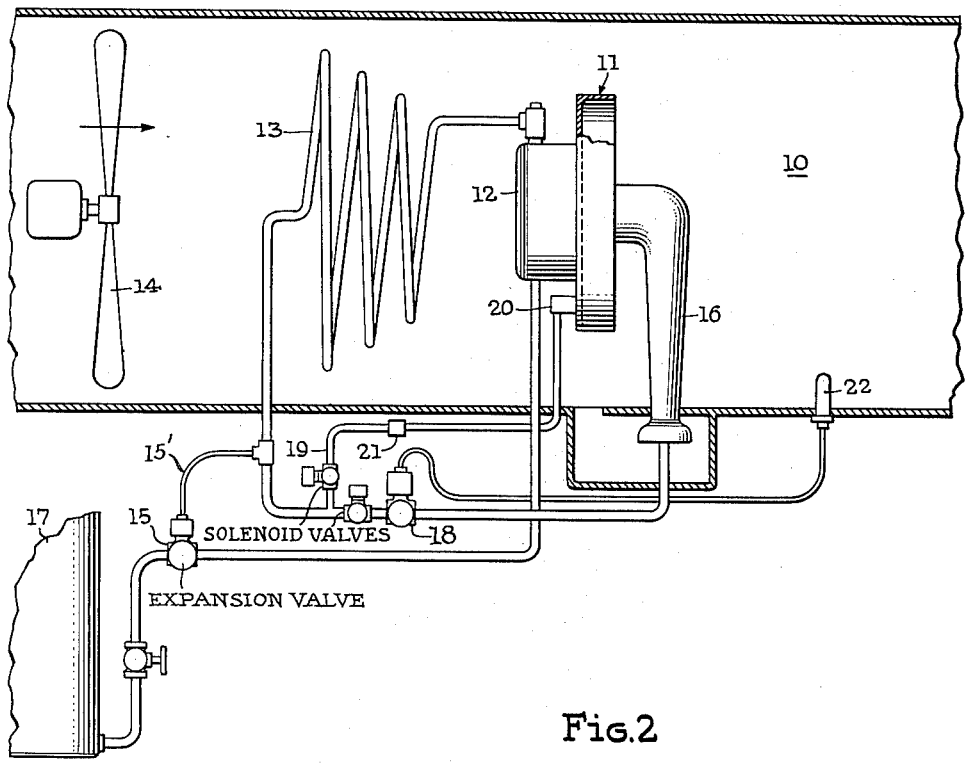
FIG. 1 is a partly schematic showing of a preferred embodiment of the present invention.

Referring now to the drawings, FIG. 1 shows a burner arrangement and fuel feeding system for a crop drier in accordance with a preferred embodiment of the present invention. The duct 10, which is preferably circular in cross-section, houses the main burner 11 as well as the vaporizer chamber 12 and the aftercooler 13. Means such as a fan 14 are also provided to create a forced flow of air to be heated by the burner and then circulated to the crops to be dried. It will be noted that the vaporizer chamber 12 is in direct heat exchange relationship with the burner 11. This insures a sufficient elevation of temperature in the vaporizer chamber to effect complete vaporization of whatever liquid fuel is still present in the line after going through an expansion valve 15. The line 15' is a pressure-control line placing the valve 15 under the direct control of the pressure in the line leading from the outlet side of the aftercooler 13. Immediately preceding and connecting with the main burner 11 is a conventional elbow Venturi 16 which is fed with air under slightly elevated pressure by its connection with the interior of the duct 10, in which there is a forced movement of air.

Starting with a source of liquefied petroleum gas such as indicated by the tank 17, the present invention will be most clearly understood by tracing the flow of fuel from the tank 17 to the burner 12. The first element in this line of fuel flow from tank to burner is the expansion valve 15 which is controlled in accordance with the pressure existing in the line immediately ahead of the valve which meters the fuel supply to the burner. Liquid fuel, therefore, is at least partially vaporized in passing through the expansion valve and a mixture of liquid and gaseous fuel is then fed to the vaporizer 12 for complete vaporization. The heat of the main burner is conducted to the vaporizer and is sufficient to insure complete vaporization of the fuel at this point. From the vaporizer, the thus vaporized and heated fuel is led to the aftercooler heat exchanger 13, which, as will be noted from the drawing, is positioned upstream of the burner as regards the flow of air through the duct. The aftercooler is, therefore, subjected to a flow of air which is considerably cooler, just how much depending upon the ambient temperature, than the heated air which would exit from the delivery end of the duct.

From the aftercooler 13, the gaseous fuel then passes to a metering valve 18 which automatically controls the rate of fuel fed to the burner. Immediately ahead of the metering valve, there is a tap-off line 19 to supply a pilot burner 20 through a flow regulating orifice 21. The metering valve 18 may conveniently be responsive to the temperature of air on the outlet side of the duct, and if this is desired, then a simple temperature sensing bulb 22 as shown may be positioned downstream of the burner and connected to the metering valve in a well-known fashion.

In view of the fact that at certain times of the year, the temperature of air flow over the burner may be as low as zero degrees, and during other times of the year the temperature may be as high as 110 degrees, and further in view of the fact that the rate of burning of fuel also has a definite effect on the amount of heat transmitted to the vaporizer and, of course, the changes in the amount of gas flowing through the vaporizer, depending on the setting of the expansion valve, it is essential that the aftercooler be embodied in the fuel feeding circuit in order that the temperature of gas fed to the metering valve may be maintained within fixed limits which will not be detrimental to the life or operation of the valve. The need for the aftercooler will be further apparent when considering the fact that there are problems in connection with the design of a vaporizer which are insurmountable to insure complete vaporization of the liquid and yet maintain gas temperatures within the desired and acceptable limits for the apparatus downstream of the vaporizer.

Figure 2:
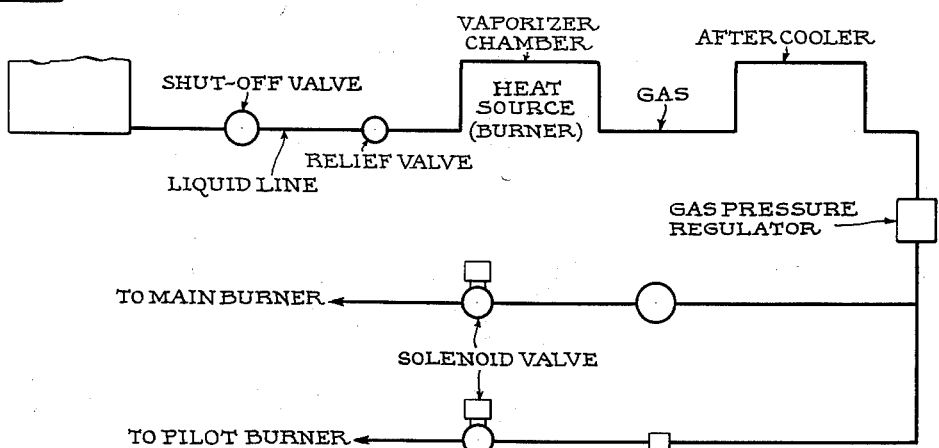
FIG. 2 is an entirely schematic showing of a modification of the invention shown in FIG. 1.
Figure 3:
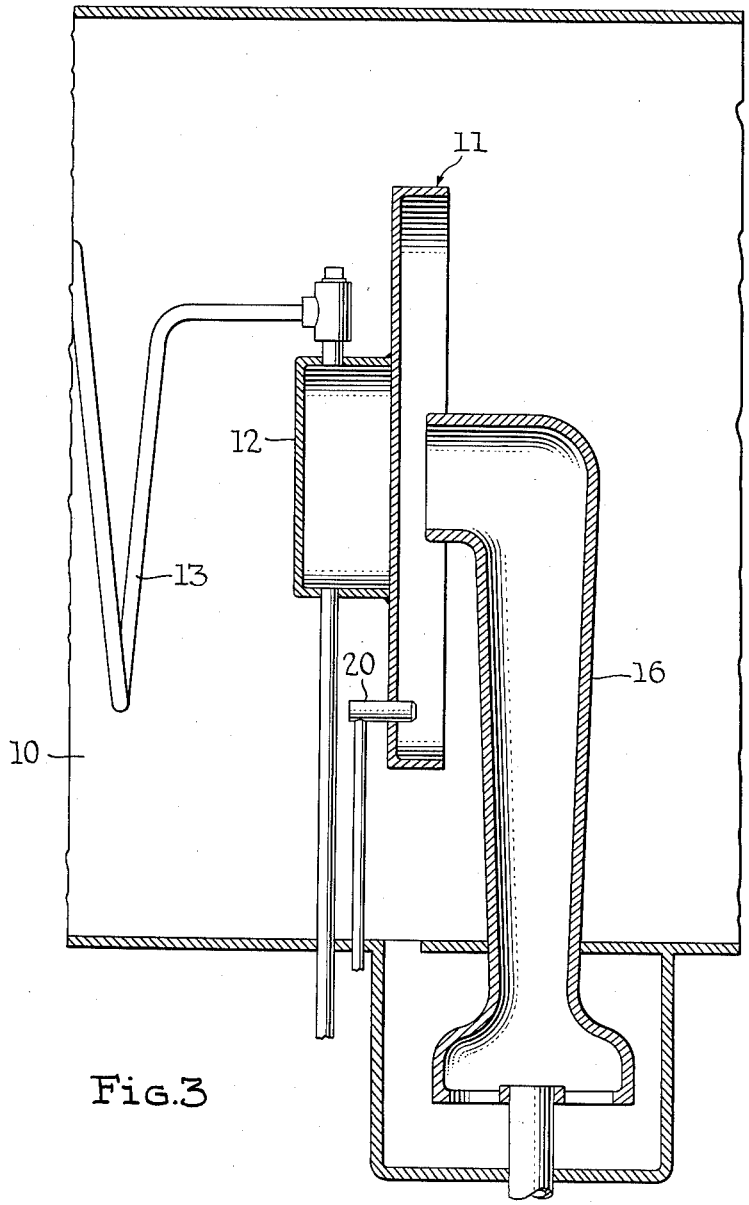
FIG. 3 is a view similar to FIG. 1 but on an enlarged scale and showing the burner in section rather than elevation.

The fuel feeding sysem as shown in FIG. 2 is essentially the same as that shown in FIG. 1, with the exception that there is no reduction in pressure of the liquefied petroleum gas prior to its admission into the vaporizer chamber. In other words, the vaporizer chamber and the aftercooler are both operated at high pressure and the pressure is not dropped to a level satisfactory for admission to the burner until after it leaves the aftercooler. Otherwise, the two fuel feeding systems are the same.

The use of the metering valve 18 produces a modulation of the burner in accordance with duct temperature and therefore effects very evenly controlled operation. Under certain circumstances however, satisfactory operation can be achieved by using a manually set metering valve and allowing the temperature sensing element 22 to cycle the main burner through a solenoid valve. The control effected is somewhat rougher than with the modulating arrangement but is nevertheless satisfactory under certain conditions. If a manual valve is used, a satisfactory one is a #88 Crane Co. valve which appears in the Crane Co. 1960 catalog on page 36. If the valve is to be of the automatic type as indicated in the drawing to be thermostatically controlled in accordance with temperatures in the duct, then a satisfactory one is a Minneapolis Honeywell Regulator Co. modulating thermostatic gas valve #5159A.

In FIG. 1, the expansion valve is shown as controlled by the pressure in the line immediately downstream of the vaporizer. The exact location of the control point however is not critical and satisfactory operation has been achieved by connecting the control point immediately downstream of the expansion valve itself.

While not shown in the drawings, it will be appreciated by those skilled in the art that the solenoid valves shown in the pilot and main burner lines will in practice be connected in a safety circuit which will automatically close these valves in the event that there is flame failure of the pilot burner. Also an overriding control responsive to excessive temperatures in the duct is used to shut off the entire apparatus under those conditions.

From the foregoing, it will be apparent to those skilled in the art that there is herein shown and described a new and useful fuel feeding system for liquefied petroleum gas burners. Preferred embodiments have been herein shown and described, and particularly as regards the application of the basic principles to a burner for a crop drier. Variations of the basic system are, of course, contemplated and are intended to be embodied within the scope of the appended claims.

I claim:

1. A fuel feeding system for liquefied petroleum gas burners comprising the following elements serially connected for fuel flow between a fuel source and a burner in the order named: an expansion valve; a vaporizer; means for extracting heat from the vaporized fuel; and a metering valve.

2. A system as defined in claim 1 in which the said vaporizer is in heat exchange relation to said burner.

3. The method of burning liquefied petroleum gas comprising: expanding the liquefied gas to a gaseous state in the presence of added heat and reduced pressure; cooling said vaporized gas; and feeding said cooled vaporized gas at a controlled rate to a burner.

4. A fuel feeding system for a liquefied petroleum gas burner comprising the following elements serially connected for fuel flow between a fuel source and the burner in the order named: a vaporizer chamber; means for extracting heat from the vaporized gas; a pressure reducing means; and a metering valve.

5. Apparatus for the combustion for useful heating purposes, of liquified petroleum gas, comprising: a burner; a vaporizer in direct heat-exchange relation to said burner; means affording connection of a source of liquified petroleum gas to said vaporizer; heat-exchange means connected to said vaporizer for positively extracting heat from the vaporized liquid; and a metering valve connected between said heat-exchange means and said burner.

6. Apparatus for the combustion for useful heating purposes, of liquified petroleum gas, comprising: a duct member; fan means for establishing a flow of air through said duct; a burner housed within said duct; a vaporizing chamber also within said duct and in direct heat-exchange relation to said burner; a heat exchanger also positioned within said duct upstream of said burner; a metering valve for controlling the flow of gaseous fuel to said burner; means including an automatic expansion valve affording connection of a source of liquified petroleum gas to said vaporizer; means connecting said vaporizer to said heat exchanger; means connecting said heat exchanger to said metering valve; and means connecting said metering valve to said burner; whereby liquified petroleum gas flows from a source through said expansion valve, to said vaporizer chamber, thence to said heat exchanger and lastly through said metering valve to said burner.

7. A liquified petroleum gas burning crop drier comprising: a duct member; a burner housed within said duct; blower means for establishing a flow of air through said duct under positive pressure; a fuel-vaporizing chamber also positioned within said duct and in heat-exchange relation to said burner; an aftercooler heat exchanger positioned within said duct upstream of said burner; means including an automatic expansion valve connecting a source of liquified petroleum gas to said fuel-vaporizing chamber; and a metering valve connected between said aftercooler heat exchanger and said burner.

8. A liquified petroleum gas burning crop drier comprising in combination: a duct member; a fan positioned within said duct for creating a positive flow of air therethrough; a gas burner positioned within said duct and having its combustion air supply ports positioned in communication with the interior of said duct so that said fan feeds combustion air to said burner under positive pressure; a vaporizing chamber in direct heat-exchange relation with said burner; an aftercooler heat exchanger connected to the outlet of said vaporizer and positioned within said duct between said fan and said burner for positively extracting heat from the gases coming from said vaporizer; means including an automatic expansion valve for connecting said vaporizer to a source of liquified petroleum gas, said valve being controlled in accordance with the pressure on the outlet side of said heat exchanger and a thermostatically controlled metering valve having a control element, said valve being connected between the outlet of said heat exchanger and said burner, said valve having its control element located in said duct downstream of said burner.

References Cited in the file of this patent

UNITED STATES PATENTS

| 2,120,078 | Schrader | June 7, 1938 |
| 2,357,575 | Benz | Sept. 5, 1944 |
| 2,374,606 | McCollum | Apr. 24, 1945 |
| 2,896,933 | Barnes | July 28, 1959 |
| 2,943,850 | Moseley | July 5, 1960 |

FOREIGN PATENTS

| 1,055,868 | Germany | Apr. 23, 1959 |